April 28, 1942.   W. BRAUER   2,281,019
SWIVEL CONNECTION
Filed April 4, 1940   2 Sheets-Sheet 1

Inventor
Walter Brauer,
By Barry, Cyr & McKnight
Attorneys

April 28, 1942.   W. BRAUER   2,281,019
SWIVEL CONNECTION
Filed April 4, 1940   2 Sheets-Sheet 2

Inventor
Walter Brauer,
By Barry, Cyr & McKnight
Attorneys

Patented Apr. 28, 1942

2,281,019

UNITED STATES PATENT OFFICE 2,281,019

SWIVEL CONNECTION

Walter Brauer, Oklahoma City, Okla.

Application April 4, 1940, Serial No. 327,902

3 Claims. (Cl. 255—25)

This invention relates to swivels for well drilling apparatus and more particularly to improvements in swivels of the type positioned between the mud-conveying goose-neck and the kelly.

Heretofore it has been customary in such swivels to employ a downwardly extending stem which rotates while the body of the swivel remains stationary whereas in my new construction, the swivel stem extends up instead of down and the body rotates relatively to the stem. This basic change is advantageous in practice.

The details of the invention and other advantages thereof will be hereinafter described in connection with the accompanying drawings in which—

Figure 1:
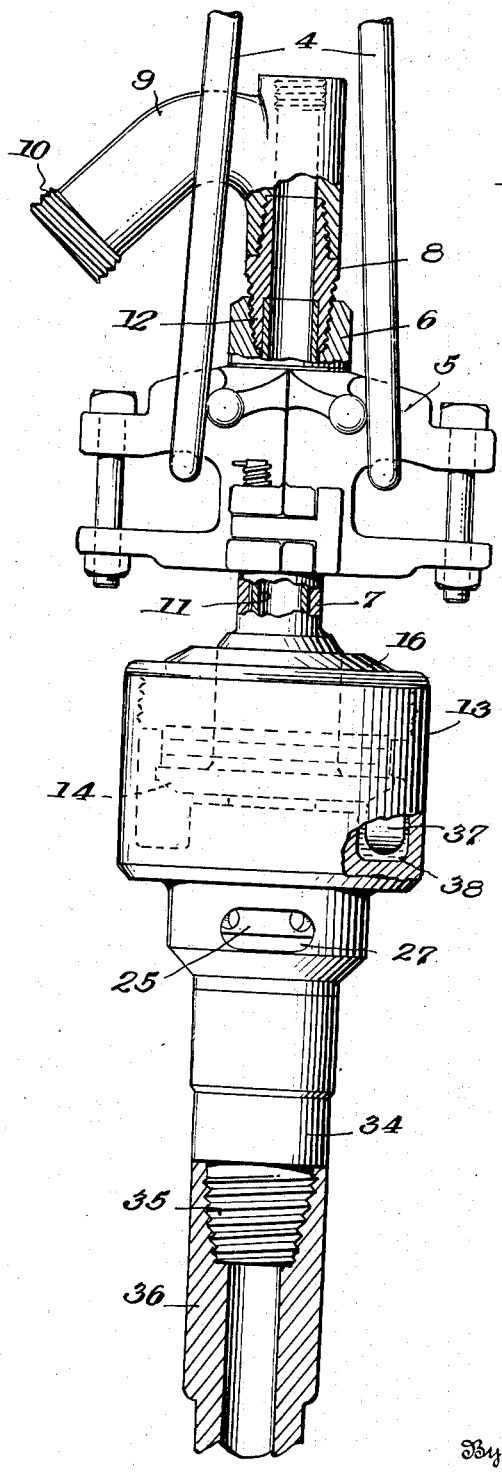
Fig. 1 is a side elevation partly in vertical section of my improved swivel shown supported by a conventional elevator and carrying a conventional kelly.
Figure 2:
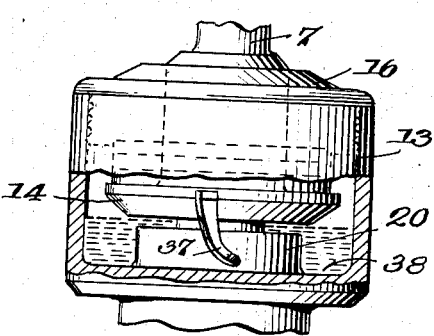
Fig. 2 is a view of the swivel per se partly in vertical section and taken at right angles to the structure shown in Fig. 1.
Figure 3:
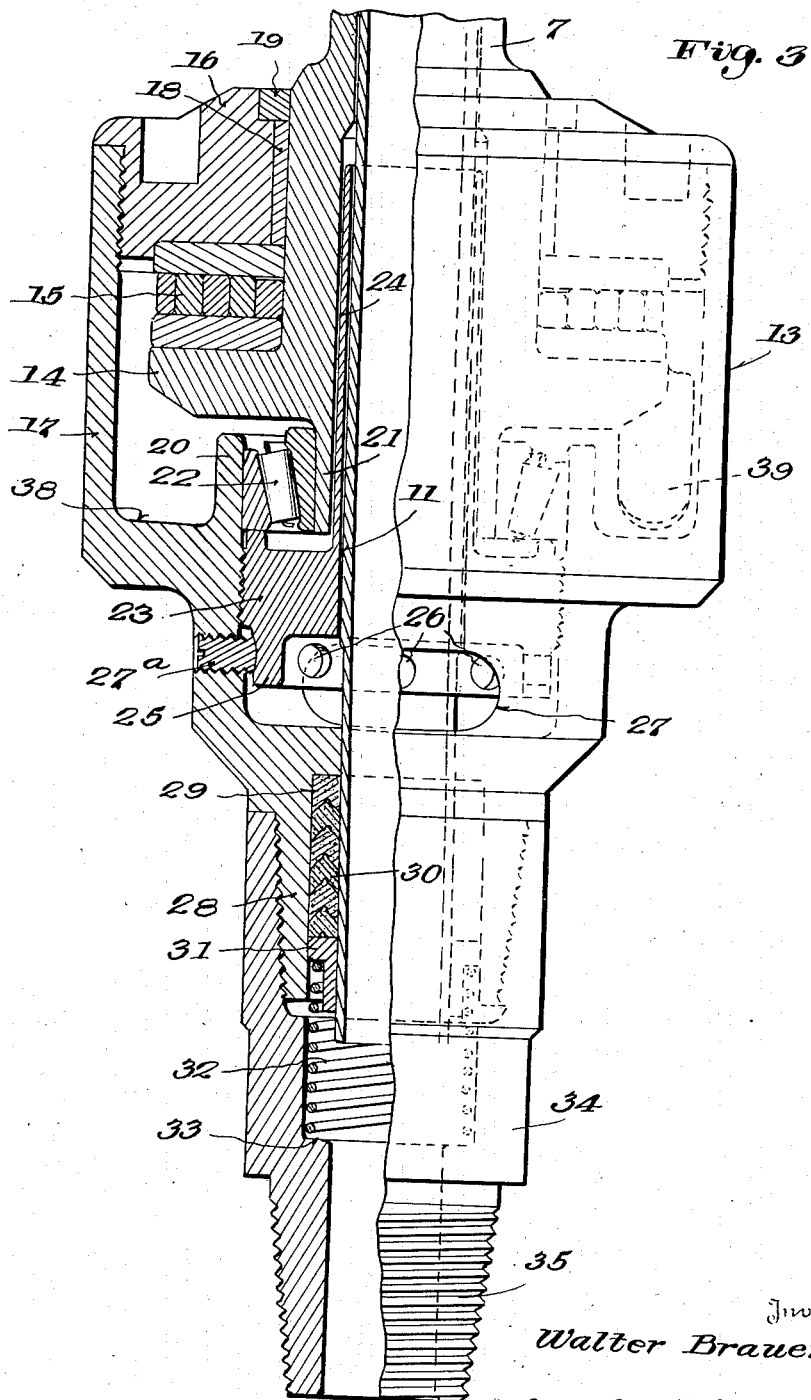
Fig. 3 is an enlarged partial vertical sectional view and partial elevation of the swivel.

Referring to the drawings, 4 designates elevator bails, which hook on spring hooks on the travel blocks (not shown). The bails support a conventional elevator 5 on which rests the enlarged or shouldered upper end 6 of a stationary swivel stem 7. The part 6 has internal threads engaging external threads of a nipple 8, which has a threaded connection with a conventional goose-neck 9 that receives the drilling mud through a hose (not shown) secured to the mud hose connection 10. A stationary wash pipe 11 has its upper end fixedly secured to the nipple, as indicated at 12, and such wash pipe passes downwardly through the stem and through the body 13 of the swivel.

The stem 7 is provided near its lower end with an annular flange 14 providing a circular shelf for the support of parts positioned below the stem. An anti-friction bearing 15 is mounted on the flange and carries a body cap 16, having threaded engagement with the annular wall 17 of the body. In accordance with the present invention, the body serves as a lubricant reservoir, and rotates in action, and in order to prevent the lubricant from escape upwardly between the stem and cap, a bronze bushing 18 and an oil seal 19 surround the stem and fill the space between the stem and the cap.

The body is provided with a short internal annular wall 20 and the stem has a depending annular skirt 21 opposite said wall, and the parts 20 and 21 coact with an annular thrust bearing 22.

In order to seal the joint between the interior of the body and the wash pipe, a nut 23 has a threaded connection with the body immediately below the wall 20, and a tube 24, integral with the nut, extends upwardly between the stem and the wash pipe. As the tube extends above the oil level in the body of the swivel, it keeps the lubricating oil from running out. It eliminates the use of a stuffing box, which causes friction.

To facilitate adjustment of the nut 23, the latter has a skirt 25 provided with spaced holes 26 to receive a suitable tool which may be inserted through an opening 27 in the swivel body. Any suitable means, such as a jam screw 27a, may be employed to lock the nut 23 in position.

The lower portion of the body terminates in an externally threaded nipple 28 having an internal recess 29 for the reception of packing 30 which snugly engages the wash pipe 11.

A packing gland 31 coacts with the packing and is forced upwardly by a coil spring 32 resting on the shoulder 33 of a sub or nipple 34; the latter having internal threads in threaded engagement with the threads of the skirt 28. The sub has external threads 35 for threaded engagement with the internal threads of a drill string driving member, such as a conventional kelly or drill pipe 36.

An oil lifting plate 37 depends from the flange of the swivel stem, into a lubricant channel 38 for the purpose of raising the lubricant oil and causing it to lubricate the bearing 15.

In operation, the member or kelly 36 which drives the drill pipe (not shown) by means of the rotary table (not shown) causes the body 13 to turn with the kelly, and consequently causes both to "line up." The action is similar to a top trying to stand vertical while spinning. This feature will take the whip out of the drilling line and blocks.

In conventional swivels, the bottom and bails stand still and the weight of the swivel on the kelly causes the block and swivel to move from side to side, whereas if the body turns as in my construction, the block and swivel have to "line up".

From the foregoing it is believed that the construction, operation and advantages of the invention may be readily understood by those skilled in the art, and I am aware that changes may be made in the details disclosed without departing from the spirit of the invention as expressed in the claims.

What I claim and desire to secure by Letters Patent is:

1. In a rotary swivel for use with well drilling equipment comprising a rotatable swivel body, a stationary swivel stem operatively connected with the well drilling equipment, said body being supported by said stem, said stem having an annular flange, an anti-friction bearing supported by the flange, said body having a portion resting on the anti-friction bearing, said body acting as a lubricant reservoir enclosed by an adjustable nut connected thereto, an integral tube extending upwardly from the nut into the stem and terminating above the lubricant reservoir, and a wash pipe inside the tube forming a conduit through the swivel.

2. A swivel for use with well drilling equipment comprising a stationary vertical tubular stem having a supporting element, a rotatable tubular body surrounding said supporting element and having a supported element, anti-friction means interposed between said elements and supported by the supporting element for supporting the body, an adjustable nut closing the lower portion of the body, a lubricant reservoir in the body, a tube extending upwardly from the nut into the stem and having its upper end terminating at an elevation above the reservoir, and a wash pipe inside the tube forming a conduit through the swivel.

3. In a rotary swivel for use with well drilling equipment comprising a rotatable swivel body, a stationary tubular vertical stem operatively connected with the well drilling equipment and provided with a supporting flange, an anti-friction bearing mounted on the flange, said rotatable body having a support portion resting on said bearing, an oil reservoir in the body, and an adjustable nut secured to the lower portion of the body, an integral tube extending upwardly from the nut to a position above the reservoir whereby leaking is prevented, a wash pipe inside the tube forming a conduit through the swivel, and an oil lifting plate connecting to the flange and extending downwardly into said body.

WALTER BRAUER.